T. E. MURRAY & H. R. WOODROW.
ELECTRIC WELDING MACHINE.
APPLICATION FILED MAR. 8, 1916.

1,187,543.

Patented June 20, 1916.
11 SHEETS—SHEET 5.

T. E. MURRAY & H. R. WOODROW.
ELECTRIC WELDING MACHINE.
APPLICATION FILED MAR. 8, 1916.

1,187,543.

Patented June 20, 1916.
11 SHEETS—SHEET 10.

Fig. 20.

Inventors
Thomas E. Murray
Harry R. Woodrow
By their Attorney

UNITED STATES PATENT OFFICE.

THOMAS E. MURRAY AND HARRY R. WOODROW, OF NEW YORK, N. Y.; SAID WOODROW ASSIGNOR TO SAID MURRAY.

ELECTRIC WELDING-MACHINE.

1,187,543.   Specification of Letters Patent.   Patented June 20, 1916.

Application filed March 8, 1916. Serial No. 82,811.

*To all whom it may concern:*

Be it known that we, THOMAS E. MURRAY and HARRY R. WOODROW, citizens of the United States, residing at New York, in the county of New York and State of New York, have invented a certain new and useful Improvement in Electric Welding-Machines, of which the following is a specification.

The invention relates to electric welding machines, and more especially to an automatically operating machine for electrically welding together the half sections of a sheet metal hub for vehicle wheels.

The hub sections are placed together, with their edges registering in a suitably recessed fixed lower electrode, which forms one member of a clamp. The upper and movable electrode, which forms the other member of said clamp, is brought down upon said hub sections. When the movable electrode is seated on the hub, circuit is closed through the secondary of a transformer, which delivers the welding current, and while said welding current is passing, electro-magnets operate a toggle mechanism, which acting on the upper electrode forces down said electrode to exert increased pressure on the joint.

The invention consists in the construction hereinafter set forth, and the circuit connections and instrumentalities therein, whereby the machine is caused to operate automatically.

In the accompanying drawings, In Fig. 2 the hub clamp is shown open, and in Fig. 3 closed.

Similar numbers and letters of reference indicate like parts.

The hub, Figs. 12, 13, 14, 15, is composed of two struck up metal plates $s$, $s'$, precisely alike, having a central opening for the axle, and equally spaced projections around their circumferential peripheries. These two plates, each forming a half section of the hub, are to be welded at their registering edges, Figs. 14 and 15. In another application for Letters Patent, Serial No. 71,616, filed January 12, 1916, we have set forth a machine for feeding spokes to this hub and for welding them thereto. The function of the present machine is automatically and electrically to weld together the two hub sections.

Figure 2:
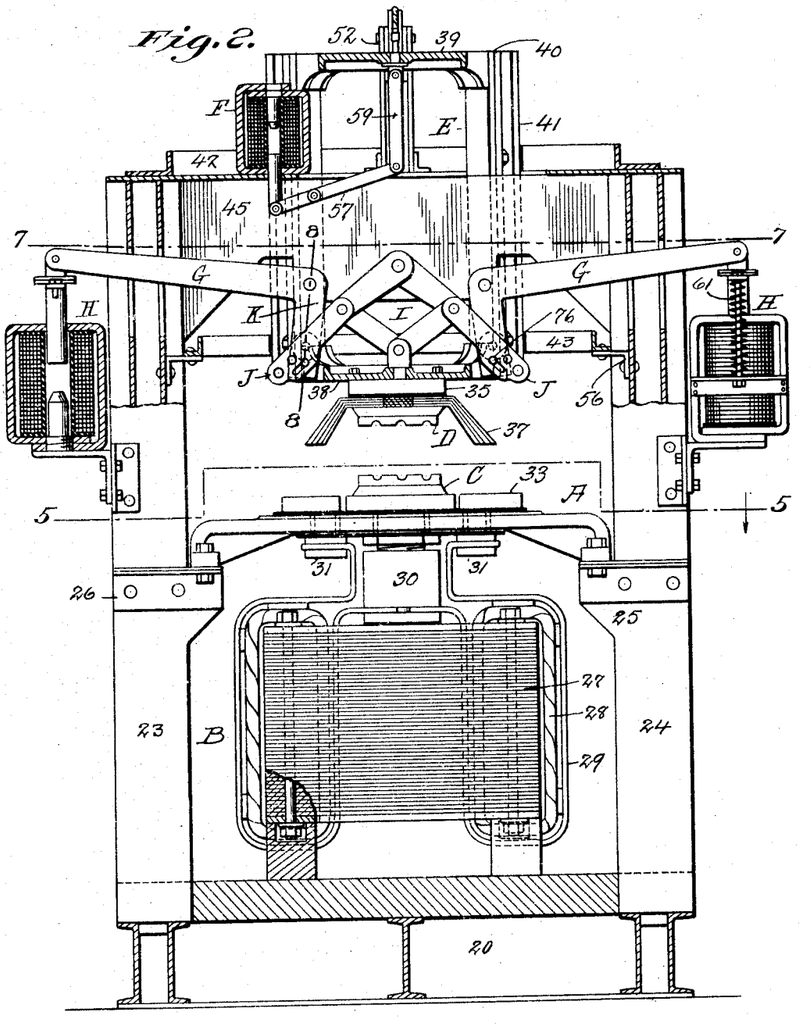
Fig. 2 is a side elevation, the upper portion of the machine being in section on the line 2, 2 of Fig. 4.
Figure 3:
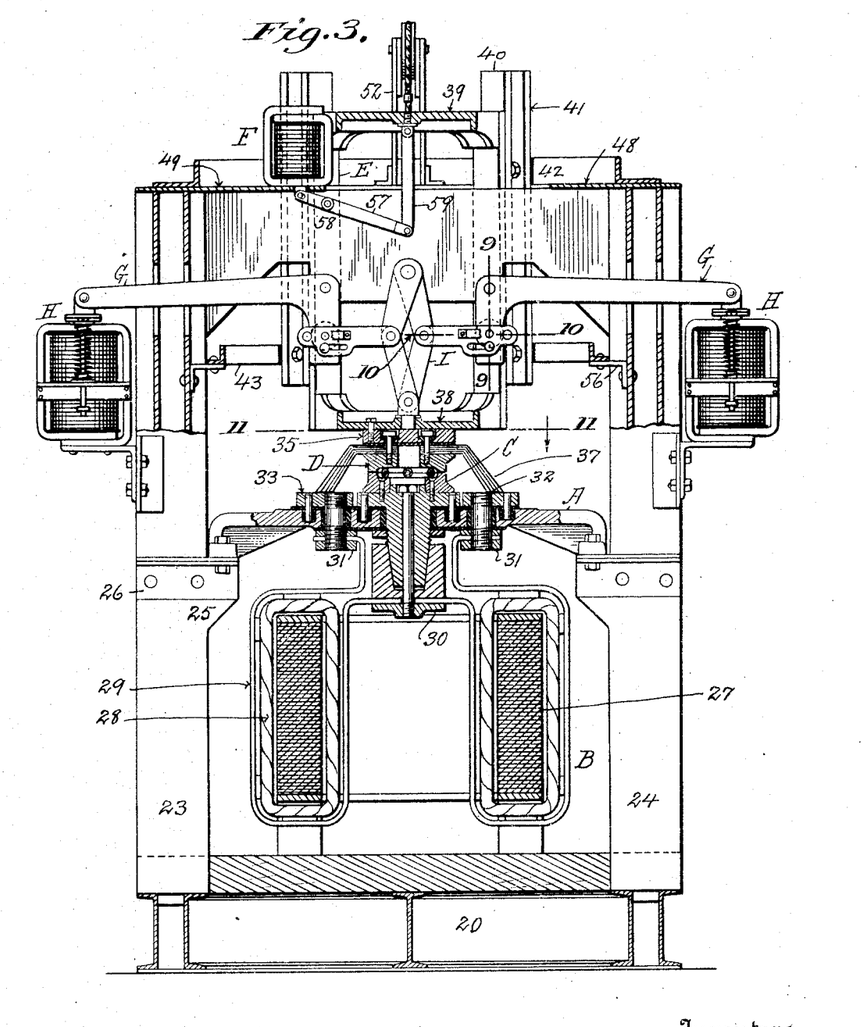
Fig. 3 is a similar elevation to Fig. 2, also in section on the line 2, 2 of Fig. 4.

Supported on the bed 20 are four hollow standards 21, 22, 23, 24, each having a shoulder 25, Fig. 2, and on opposite sides angle-irons 26, said angle-irons supporting shelves upon which are bolted the turned down and flanged corners of the table A, Fig. 3.

Figures 5, 11, 12, 13, 14, 15, 16:
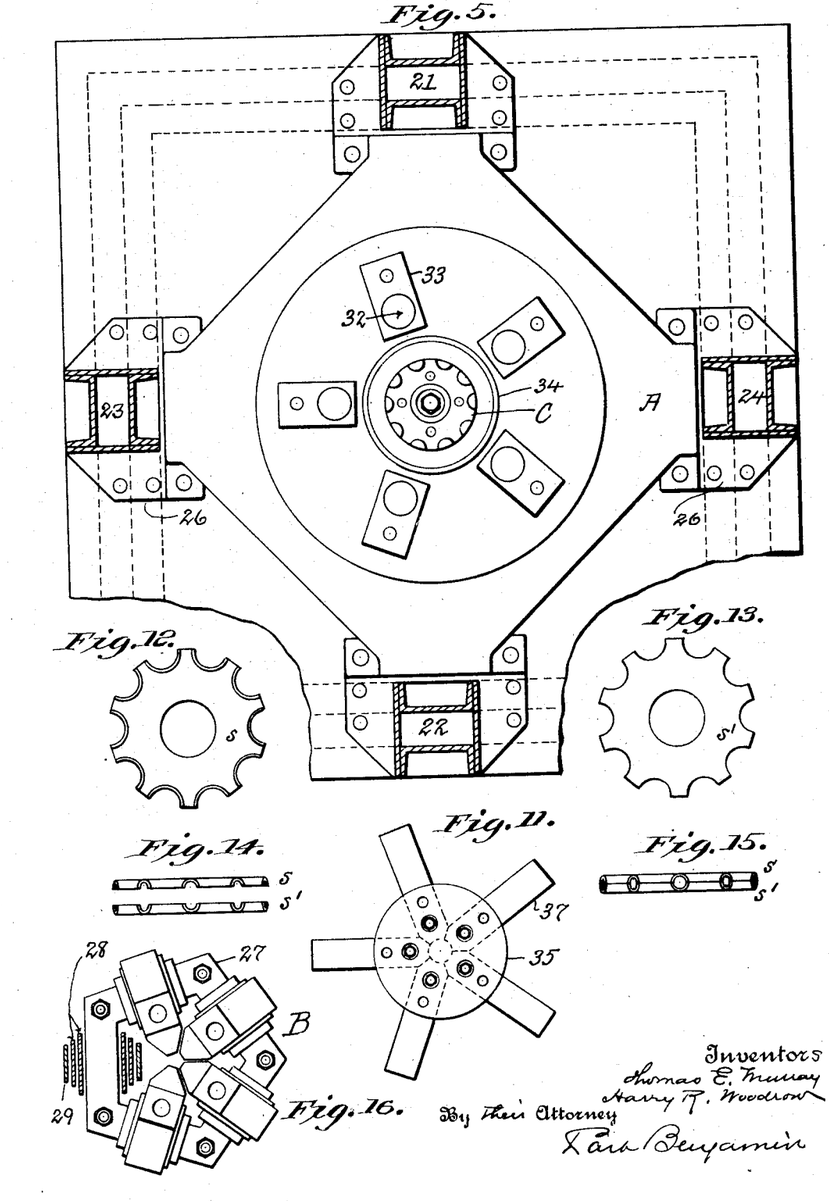
Fig. 5 is a section on the line 5, 5 of Fig. 2.
Fig. 11 is a section on the line 11, 11 of Fig. 3.
Fig. 12 is a plan view looking into one of the hub sections.
Fig. 13 is a plan view of the exterior of a hub section.
Fig. 14 is a side elevation of the sections of the hub separated.
Fig. 15 is a similar elevation, showing the sections of the hub after being welded together.
Fig. 16 is a top view of the transformer.

On the base between the standards is the pentagonal core 27 of the transformer B— see Fig. 16. In Fig. 2 one side of the core is omitted for clearness. The core is composed of horizontal laminations held between upper and lower frames connected by bolts. On each of the five sides of the core is wound a primary coil 28 in two layers, Fig. 16, and outside of the primary coil is wound the secondary coil 29.

One terminal of each secondary coil is connected to a cylindrical metal block 30, disposed below the table A. The remaining secondary terminals are connected to separate metal blocks 31, Fig. 3, insulated from the table, and supported below the same by threaded rods 32, Fig. 3. Said rods enter contact plates 33 on the upper side of said table, which are disposed in a circle around a central insulated block 34. Block 34 has a downward central projection which enters a socket in the block 30, and said blocks 34 and 30 are bolted together, as shown in Fig. 3.

Secured on the block 34 is the fixed welding electrode C, forming the lower member of a hub clamp, and having its upper surface suitably recessed to receive said hub.

The movable electrode D forms the upper member of said clamp, and is similarly recessed and bolted to a plate 35, Fig. 3, and insulated therefrom. Between plate 35 and electrode D are secured five downwardly inclined brushes 37, each adapted to coöperate with one of the five contact plates 33. In this way, circuit is established from the terminals of the several secondary coils 29 through the two parts of the hub held between the clamping electrodes C, D, and this circuit is broken at all the contact plates 33 when the upper electrode C is raised.

Figure 1:
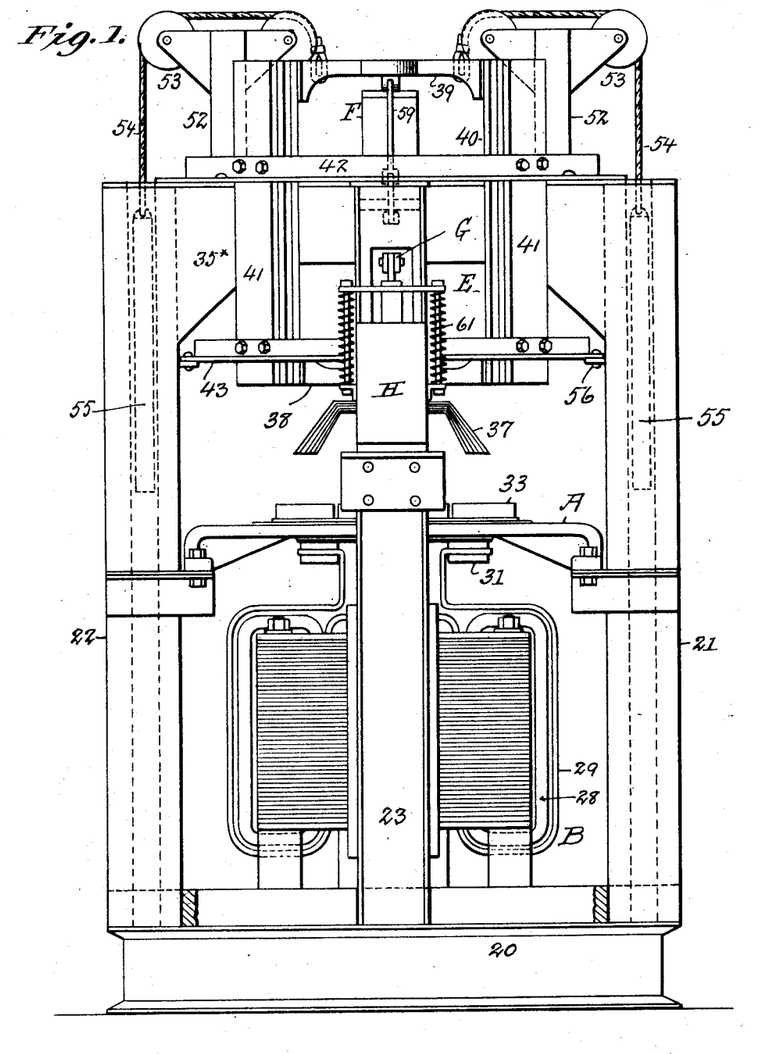
Figure 1 is an end elevation of our hub welding machine.
Figure 4:
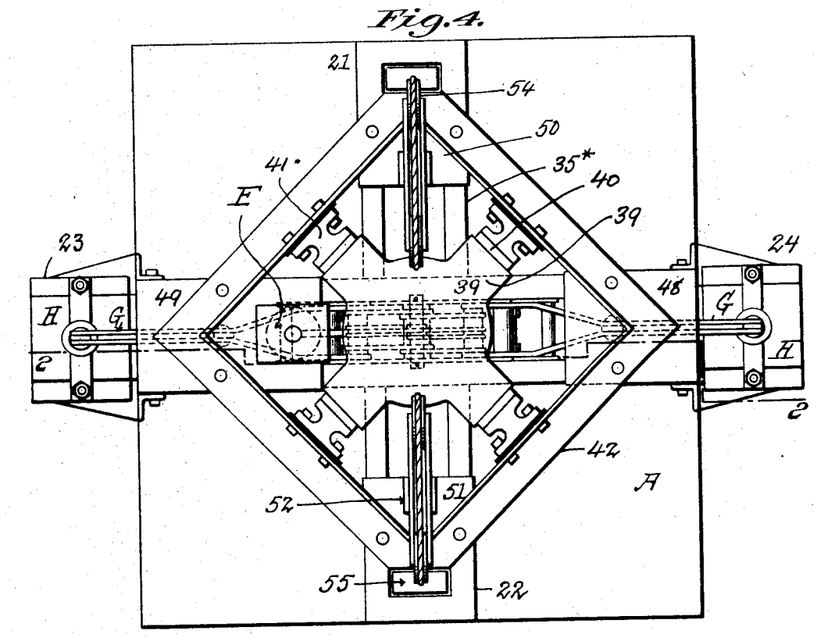
Fig. 4 is a top plan view.

The upper electrode C is operated as follows: Referring to Figs. 1, 3 and 5: the plate 35 is bolted to the horizontal lower member 38 of a vertically sliding frame E. The upper member 39 of said frame is connected to said lower member by four vertical bars 40, which bear against a like number of fixed ways 41, supported upon and within two quadrangular frames 42, 43, which in turn are constructed and supported as follows: Extending across the machine between standards 23, 24 (see Figs. 2, 3 and 7) are two parallel vertical plates 44, 45, braced by plates 35* extending from standards 21, 22, and connected to the inner sides of standards 23, 24 by angle-irons 46, Fig. 7, and mutually supported by angle-irons 47 interposed between them at their opposite ends. On the upper edges of plates 44, 45 are secured two horizontal plates 48, 49, Fig. 4. The plate 48 supports one corner of the frame 42. The plate 49 supports the opposite corner of said frame and extends into the space within said frame to serve as a support for the electro-magnet F, the purpose of which magnet will be described farther on. The remaining corners of frame 42 are supported upon plates 50, 51, Fig. 4, secured on the tops of standards 21, 22. On the portions of plates 50, 51 which extend into the space inclosed by frame 42 are mounted the standards 52, Fig. 1, on the opposite sides of each of which standards are brackets, in which brackets are journaled pulleys 53. Over these pulleys pass suspension cords 54 which are attached to the sliding frame E and to weights 55 which enter and move up and down in the hollow standards 22, 21. These weights over-balance the frame E, and hence normally hold said frame and hence the upper electrode D in raised position, as shown in Fig. 2. The lower frame 43 is supported by brackets 56 on the inner sides of the four standards 21, 22, 23, 24.

The lowering of the frame E in order to clamp the hub between upper electrodes C and D is effected by the electro-magnet F, Figs. 2 and 3, the armature of which is connected to one arm of a lever 57, pivoted at 58, between the parallel plates 44, 45. The other arm of said lever is connected to a link 59, pivoted to upper member 39 of sliding frame E. Hence when magnet F is energized, its pull over-balances frame E and causes the said frame to descend. The welding current from the transformer is now established, and while said current continues, the joint between the parts of the hub is subjected to powerful pressure by the means now to be described.

Figure 7:
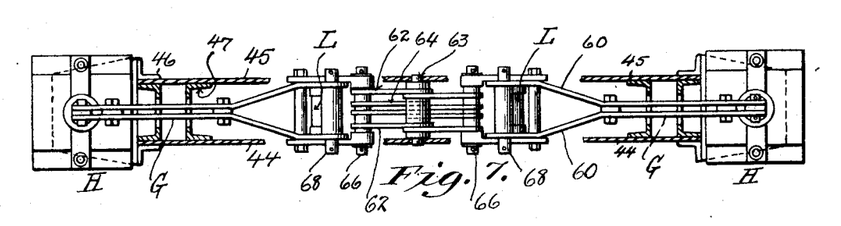
Fig. 7 is a section on the line 7, 7 of Fig. 2, showing the toggle mechanism in top view.

Pivoted between the parallel plates 44, 45 are two bell crank levers G, Fig. 7, the long arms of which are pivoted at their ends to the armatures of two electro-magnets H, supported on brackets on standards 23, 24. The levers G are alike. Each is formed of two members 60, Fig. 7, which receive between them certain locking mechanism, shortly to be described.

The pressing electro-magnets H operate through the bell crank levers G upon a toggle mechanism, generally indicated at I, and are provided with helical retracting springs 61.

Figure 6:
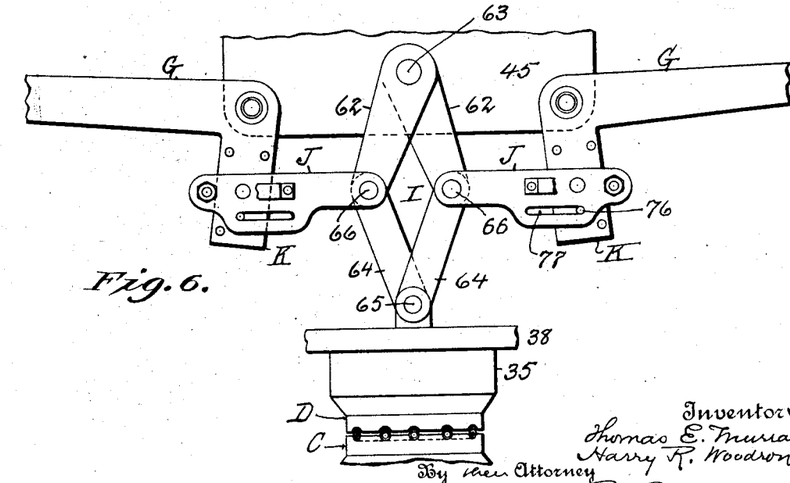
Fig. 6 is a detailed enlarged elevation of the hub clamp and pressing toggles, the hub clamp not being completely closed.

Referring to Figs. 6 and 7—the toggle has four upper arms 62 which at their upper ends are connected by a pin 63 which is fixed in the plates 44, 45, and four lower arms 64 connected at their lower ends by a pin 65 to lugs on member 38 of sliding frame E. The upper arms 62 are pivoted to the lower arms 64 on each side of the toggle by pins 66, Figs. 6 and 10, and said pins also serve to connect to the joint a link J. The link J has parallel members which receive between them the parallel members which together form the short arm K of bell crank lever G. Bell crank levers G are pivoted to plates 44, 45 and 68. The mode of connecting the link J and the short arm K of the bell crank lever G is now to be noted.

Figure 8:
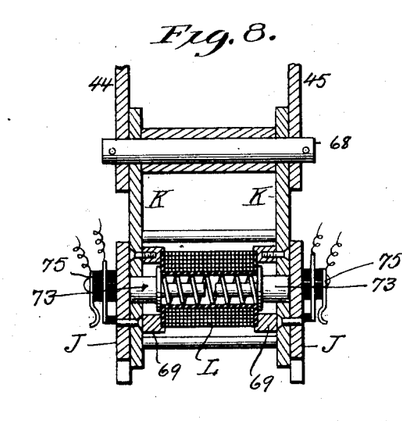
Fig. 8 is an enlarged section on the line 8, 8 of Fig. 2.
Figure 9:
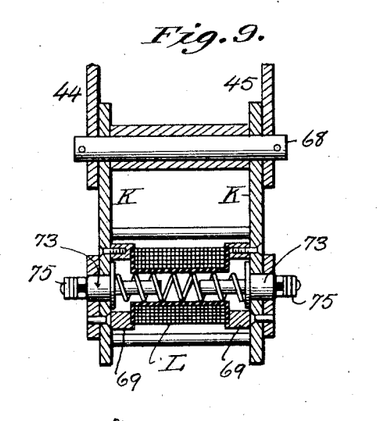
Fig. 9 is an enlarged section on line 9, 9 of Fig. 3.
Figure 10:
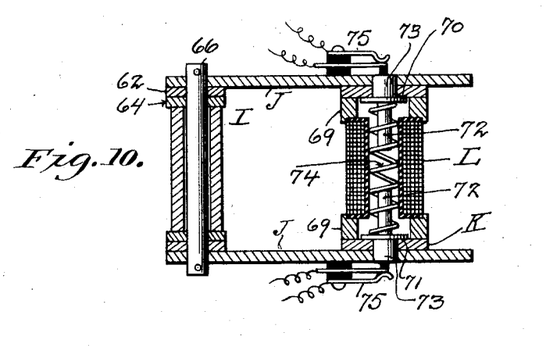
Fig. 10 is an enlarged section on line 10, 10 of Fig. 3.

The function of the electro-magnets H, as already stated, is to apply increased pressure to the welding joint, through the toggle I. This pressure is to be exerted only while the welding current is passing. If the link J were permanently pivoted to the arm K of lever G, obviously such a connection would interfere with the raising and lowering of frame E. A device, therefore, is required, whereby the said link J and the lever arm K shall be disconnected during the up and down movement of frame E, but shall be locked together at the particular time when the magnet pressure is desired, so that pressure may then be transmitted through said arm K and link J. This device is as follows: Figs. 8, 9, 10—on the inner sides of the members of the lever arm K are secured rings 69, suitably recessed to receive the ends of an electro-magnet L. Said magnet has disk armatures 70, 71 at its opposite ends, each having on its inner side a guide rod 72, and on its outer side a pin 73. A helical spring 74 is disposed within the magnet and normally sets out the pins 73 which enter openings in the members of lever arm K. There are also openings in the members of link J, but the pins 73 cannot enter the link openings until after said link openings come into registry with the lever arm openings. Thus, referring to Fig. 8, pins 73 being retracted are in the lever arm openings, but are not in the link openings in the link arms because said openings are not in registry. The outer ends of the pins then simply abut against the link members. In Figs. 9 and 10 the openings in the link J and lever arm K have come into registry, and the electro-magnet having released the pins 73, they have been removed outwardly by the spring 74 to enter the registering openings in link and lever arm, and so to lock said link and lever arm together. This locking of lever arms K and links J occurs just before the magnets H exert their power on toggle I to cause said toggle to act upon frame E. When the pins 73 are moved into locking position, they close pairs of spring contacts 75 on opposite sides of the link arms, as shown in Fig. 10, and when said pins are retracted, the said contacts separate, as shown in Fig. 8.

In order that the link J may be guided into proper position for registry of its openings with the openings in the lever arm K, we provide on said arm K pins 76 which are received and move freely in an elongated slot 77, Fig. 6, in said link. When the toggle I is in laterally extended position, as shown in Fig. 2, the pins 76 are in the inner ends of the slots 76, and when said toggle is in the position shown in Fig. 6, the pins are in the outer ends of said slots. It will, of course, be noted that the pins and slots are only a guide device, and that the pressure exerted by the magnets H is not transmitted through said pins to the links J.

The circuits in the apparatus and their changes during its operation will now be described.

Figure 17:
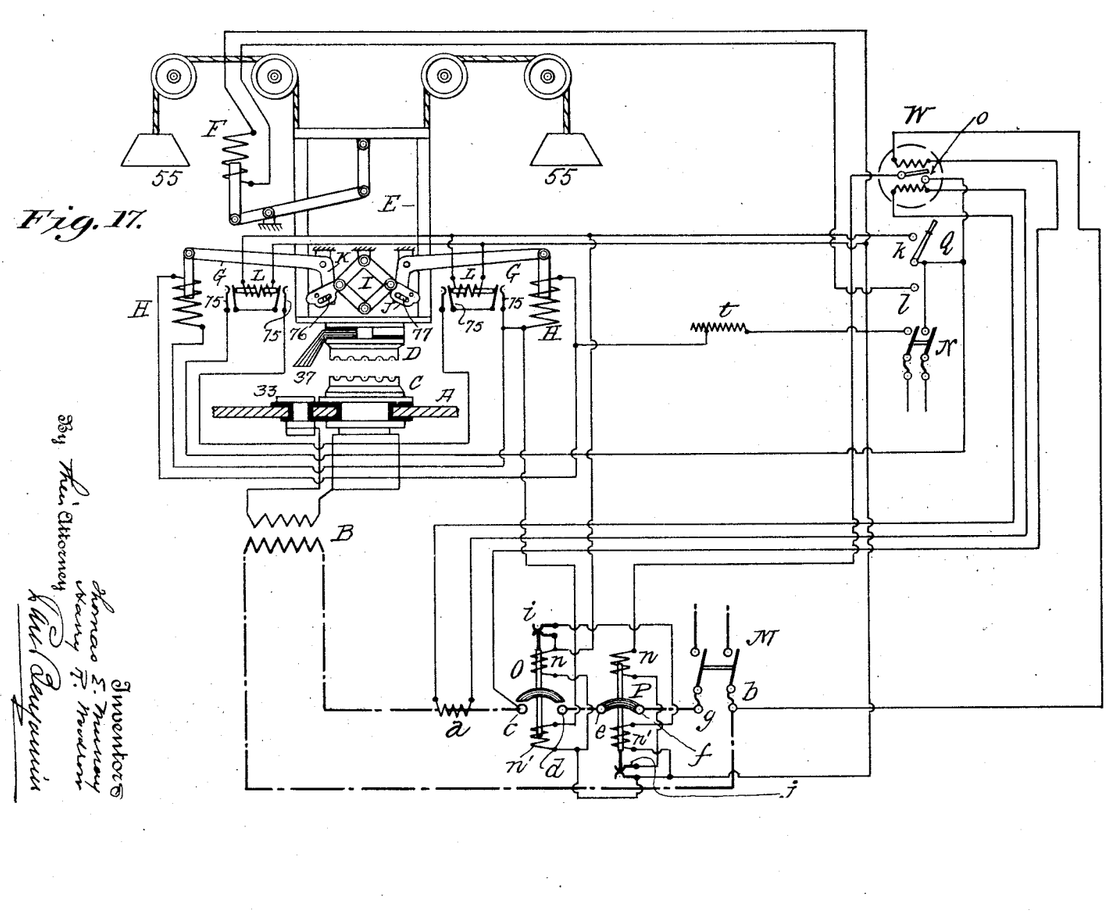
Figs. 17, 18, 19, 20 and 21 are electrical diagrams, showing the circuits and positions of the various parts of the machine during the operation thereof.

Fig. 17 shows the conditions when the machine is ready to begin its operation. The frame E is raised by the weights 55, and the toggle I is laterally extended. The switch M opens and closes circuit to the main source of alternating current supply for the transformer. The switch N opens and closes circuit to a source of direct current supply which energizes the various electro-magnets.

A wattmeter relay W is provided for automatically controlling the duration of the welding current. The terminals of one of the coils in said relay are connected to a current transformer $a$. The terminals of the other coil are respectively connected to one terminal $b$ of switch M and to a contact $c$ of switch O. There are two similar switches O, P. The contact $d$ of switch O is connected to contact $e$ of switch P, and the contact $f$ of switch P is connected to the contact $g$ of switch M.

The switches O, P are carried on rods which enter magnet coils $n$, $n'$ respectively above and below said switches, whereby when either the upper or the lower coils are energized, said switches are moved to open or close circuit. At $i$ and $j$ are pairs of normally open spring contacts, contacts $i$ being closed when switch O is opened, and contacts $j$ being closed when switch P is closed. The terminals of the primary winding of transformer B are connected to the contacts $b$ and $c$.

Figure 18:
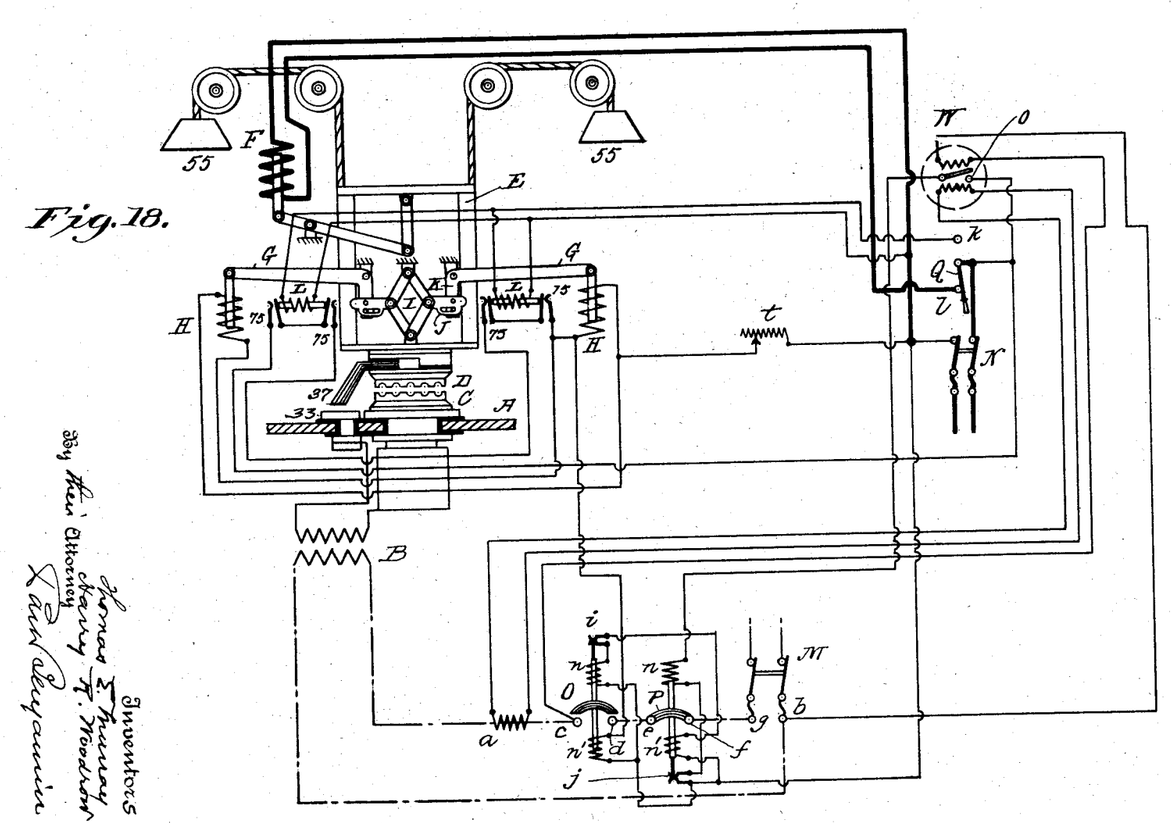
Figure 19:
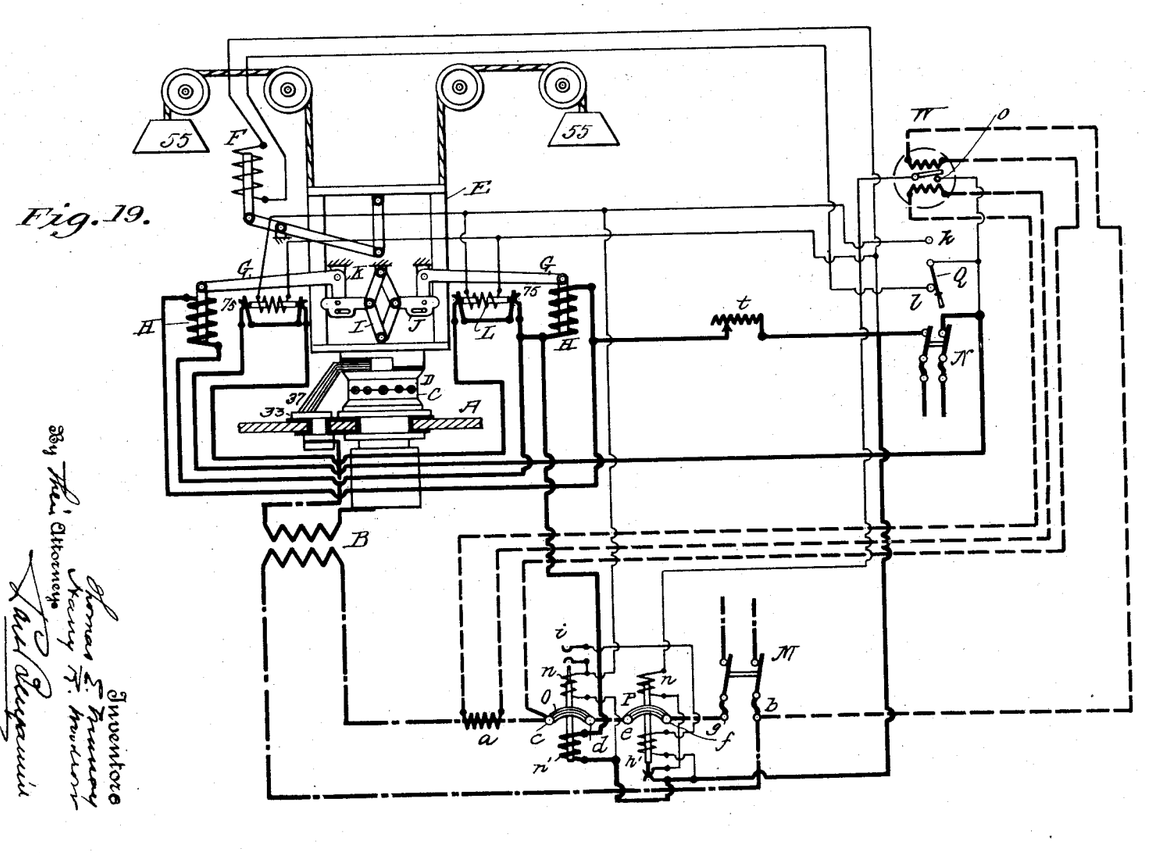

At Q is shown the master or controlling switch lever which coöperates with two contacts $k$ and $l$. Said lever is connected to one contact of switch Q. At the outset, as shown in Fig. 1, the switch Q, switch M, switch N and switch O are open. Switch P is closed. The operator having placed the hub sections edge to edge in the electrode D, moves switch Q to close contact at 1. The resulting active circuit is shown in heavy lines in Fig. 18: that is to say, the magnet F is energized and begins to draw downwardly the sliding frame E. This downward movement continues until the hub sections are clamped between electrodes C, D, at which time the brushes 37 meet the contact plates 33 on table A. The resulting condition is shown in Fig. 19. The wattmeter W begins to operate, so that its moving member travels toward a contact $o$. In Fig. 19, said moving member is shown as not having yet reached said contact $o$. The lower controlling coil of switch O is energized to close circuit at contacts $c$, $d$. Circuit thus being established to the transformer B, the welding of the hub sections begins. At the same time the magnets H are energized to apply heavy pressure through the toggle I at the welding joint. The electro-magnets L are not yet energized, so that the contacts which they control remain closed.

Figure 20:
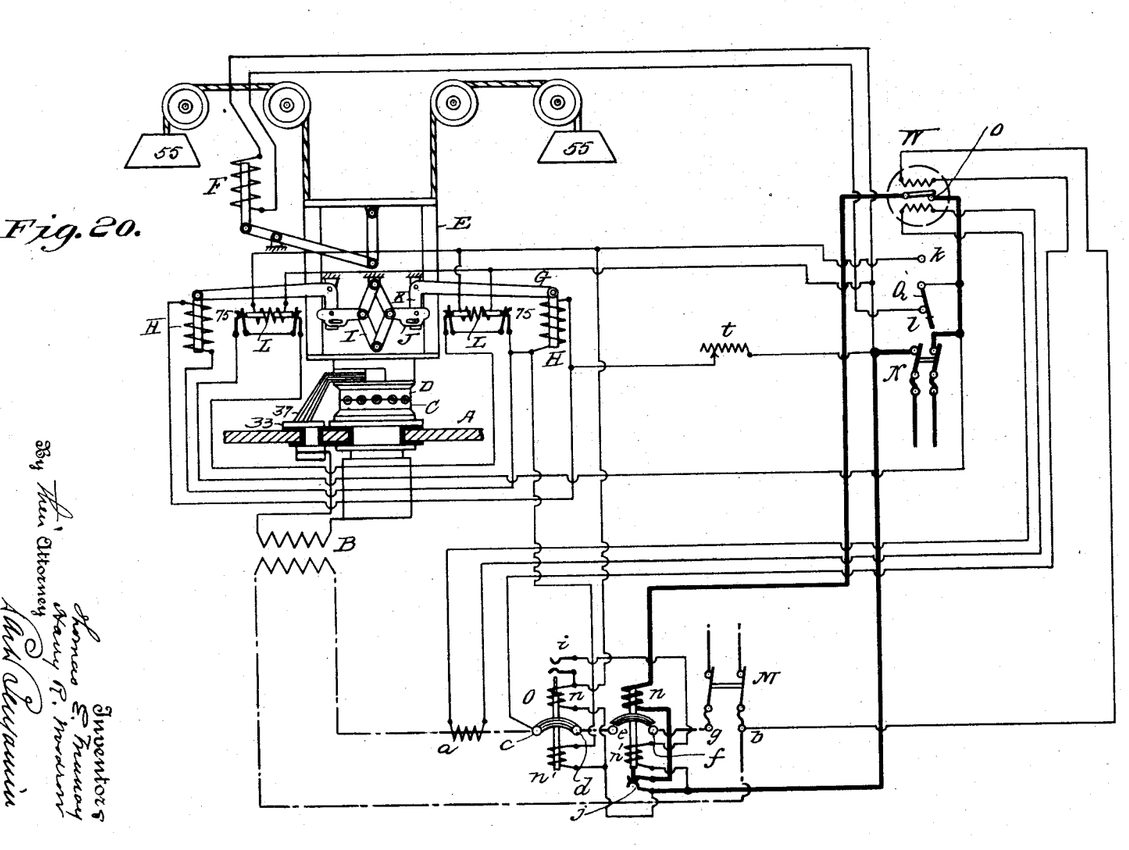
Figure 21:
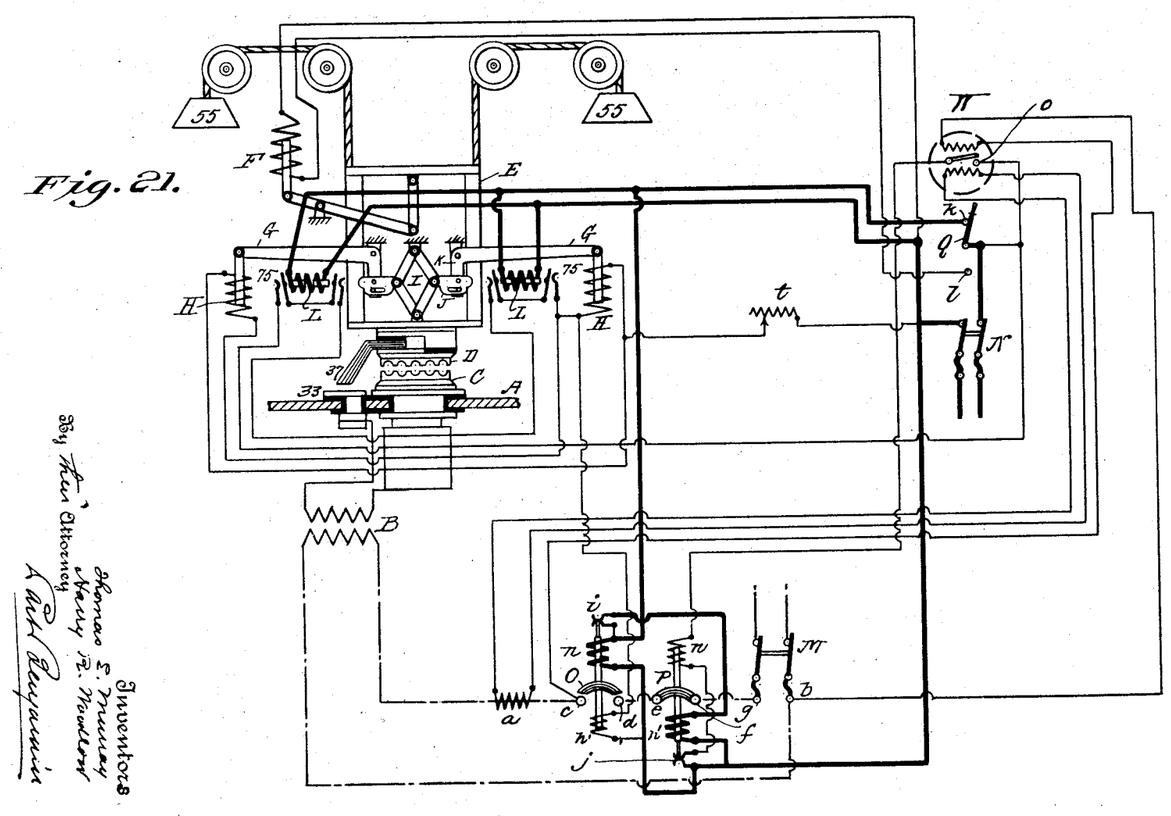

The wattmeter W after a certain predetermined period of time—which is the welding period—closes contact at $o$, as shown in Fig. 20, so closing circuit through the upper controlling coil of switch P, raising said switch and interrupting the welding current to transformer B. The operator now throws master lever Q to contact $k$. The result is shown in Fig. 21. The lower controlling coil $n'$ of switch P being energized keeps circuit closed at contacts $e$, $f$. The upper controlling coil $n$ of switch O being energized breaks circuit at contacts $c$, $d$. The spring contacts at $i$ and $j$ are closed. Both electro-magnets L are energized, thus breaking circuit at their contacts 75. The magnet F being deënergized, the weights raise the frame E and permit of the removal of the now welded hub. The opening of master lever Q and switches M, N completes the cycle and brings the circuits back to the condition of Fig. 1. The current to magnets H is controlled so as to vary the pull of said magnets by a variable resistance $t$.

The multiple connections of the secondary coils of the transformer to the electrodes serve to distribute the welding current uniformly around the hub sections.

We claim:

1. An electric welding machine, comprising a fixed electrode forming one member of a clamp for the bodies to be welded, a movable electrode forming the other member of said clamp, means for moving said movable electrode to close said clamp, electrically operated means for establishing the welding current, and electrically operated means for subjecting the movable electrode to pressure, both of said means being actuated by the closing of said clamp.

2. An electric welding machine, comprising a fixed electrode forming one member of a clamp for the bodies to be welded, a movable electrode forming the other member of said clamp, means for moving said movable electrode to close said clamp, an electrically operated device for subjecting the movable electrode to pressure normally disconnected from said electrode, and mechanism for connecting said device to said electrode actuated by the closing of said clamp.

3. An electrically operated apparatus for electric welding, comprising clamping electrodes for the bodies to be welded, electrically operated means for closing said clamp, electrically operated means for subjecting said clamp to increased pressure, and electrically controlled means for locking said pressure means to said clamp.

4. An electrically operated apparatus for electric welding, comprising clamping electrodes for the bodies to be welded, electrically operated means for closing said clamp, electrically operated means for subjecting said clamp to increased pressure, means for locking said pressure means to said clamp, and electrically operated means for releasing said locking means.

5. An electric welding machine, comprising a plurality of hollow standards, a horizontal fixed frame supported by and between said standards, vertical ways in said fixed frame, a sliding frame guided by said ways, counter-weights for said sliding frame disposed in said hollow standards, an electro-magnet having its armature connected to said frame and operating when energized to move said frame downwardly in said ways, an electrode carried by said frame and forming one member of a clamp for holding the bodies to be welded, a fixed electrode forming the other member of said clamp, and a support for said fixed electrode.

6. An electric welding machine, comprising a fixed electrode, a movable electrode, the said electrodes forming a clamp for the bodies to be welded, means for opening and closing said clamp, and an automatically operating device for applying pressure to said movable electrode when said clamp is closed.

7. An electric welding machine, comprising a fixed electrode, a movable electrode, the said electrodes forming a clamp for the bodies to be welded, means for opening and closing said clamp, an automatically operating device for applying pressure to said movable electrode, and automatic means for mechanically connecting said device to said electrode when said clamp is closed.

8. An electric welding machine, comprising a fixed electrode, a movable electrode, the said electrodes forming a clamp for the bodies to be welded, means for opening and closing said clamp, an automatically operating device for applying pressure to said movable electrode when said clamp is closed, and means for varying the pressure exerted by said device.

9. An electric welding machine, comprising a fixed electrode, a movable electrode, the said electrodes forming a clamp for the bodies to be welded, means for opening and closing said clamp, and an electro-magnet operating when energized to apply pressure to said movable electrode when said clamp is closed.

10. An electric welding machine, comprising a fixed electrode, a movable electrode, the said electrodes forming a clamp for the bodies to be welded, means for opening and closing said clamp, an electro-magnet operating when energized to apply pressure to said movable electrode when said clamp is closed, and a variable resistance in circuit with said magnet.

11. An electric welding machine, comprising a plurality of vertical standards, vertical ways supported by said standards, a frame slidable in said ways and having a bottom member, a transverse support extending between two of said standards, a toggle pivoted at its upper joint to said support and at its lower joint to said bottom frame member, levers pivoted to said support and to the side joints of said toggle, electro-magnets controlling said levers, an electrode carried by said frame and forming one member of a clamp for holding the bodies to be welded, a fixed electrode forming the other member of said clamp, and a support for said fixed electrode.

12. An electric welding machine, comprising a plurality of vertical standards, vertical ways supported by said standards, a frame slidable in said ways and having a bottom member, a transverse support extending between two of said standards, a toggle pivoted at its upper joint to said support and at its lower joint to said bottom frame member, bell crank levers pivoted to said transverse support and their inner arms mechanically connected to the side joints of said toggle, electro-magnets having their armatures connected to the outer arms of said levers, an electrode carried by said frame and forming one member of a clamp for holding the bodies to be welded, a fixed electrode forming the other member of said clamp, and a support for said fixed electrode.

13. An electric welding machine, comprising a fixed electrode forming one member of a clamp for the bodies to be welded, a vertically movable electrode forming the other member of said clamp, means for raising and lowering said movable electrode, a fixed support, a link, a toggle having its ends respectively pivoted to said fixed support and said movable electrode and its intermediate joint to said link, a bell crank lever pivoted at its angle to said fixed support, an electro-magnet having its armature connected to the outer horizontal arm of said lever, and automatically operating means for locking together said vertical lever arm and said link upon the closing of said clamp.

14. An electric welding machine, comprising a fixed electrode forming one member of a clamp for the bodies to be welded, a vertically movable electrode forming the other member of said clamp, means for raising and lowering said movable electrode, a fixed support, a link, a toggle having its ends respectively pivoted to said fixed support and said movable electrode and its intermediate joint to said link, a bell crank lever pivoted at its angle to said fixed support, there being an opening in said link and an opening in an arm of said lever, an electro-magnet carried by said lever arm, a pin on the magnet armature adapted to enter said link and lever arm openings when in registry to lock together said link and lever arm, a setting out spring for said pin, and an electro-magnet having its armature connected to the other arm of said bell crank lever.

15. An electric welding machine, comprising a fixed electrode forming one member of a clamp for the bodies to be welded, a vertically movable electrode forming the other member of said clamp, means for raising and lowering said movable electrode, a fixed support, a link, a toggle having its ends respectively pivoted to said fixed support and said movable electrode and its intermediate joint to said link, a bell crank lever pivoted at its angle to said fixed support, there being an opening in said link and an opening in an arm of said lever, an electro-magnet carried by said lever arm, a pin on the magnet armature adapted to enter said link and lever arm openings when in registry to lock together said link and lever arm, a setting out spring for said pin, means for guiding said link and lever arm to bring said openings into registry when said clamp is closed, and an electro-magnet having its armature connected to the other arm of said bell crank lever.

16. An electrically operated apparatus for electric welding, comprising two clamping electrodes receiving between them the bodies to be welded, means for controlling the clamping of said bodies in said electrodes, an electro-magnet actuating said clamp controlling means and connected in direct current circuit, and means for establishing alternating current circuit at the welding joint.

17. An electrically operating apparatus for electric welding, comprising two clamping electrodes receiving between them the bodies to be welded, means for controlling the clamping of said bodies in said electrodes, an electro-magnet actuating said clamp controlling means and connected in direct current circuit, means for establishing alternating current circuit at the welding joint, and means for determining the duration of said welding current.

18. An electrically operated apparatus for electric welding, comprising electrodes receiving between them the bodies to be welded, means for establishing circuit at the welding joint operated by direct current, means for establishing an alternating current circuit at the welding joint, and electrically controlled means for determining the duration of said welding current.

19. An electrically operated apparatus for electric welding, comprising two clamping electrodes receiving between them the bodies to be welded, means for controlling the clamping of said bodies in said electrodes, an electro-magnet actuating said clamp controlling means and connected to a direct current circuit, means for establishing an alternating current circuit at the welding joint, means for subjecting the joint between said bodies to increased pressure after said clamping is effected, and an electro-magnet actuating said pressure means, the said magnets being connected to a source of direct current.

20. An electrically operated apparatus for electric welding, comprising two clamping electrodes receiving between them the bodies to be welded, means for controlling the clamping of said bodies in said electrodes, an electro-magnet actuating said clamp controlling means and connected to a direct current circuit, means for establishing an alternating current circuit at the welding joint, means for subjecting the joint between said bodies to increased pressure after said clamping is effected, an electro-magnet actuating said pressure means, the said magnets being connected to a source of direct current, and means for determining the duration of said welding current.

21. An electrically operated apparatus for electric welding, comprising electrodes receiving between them the bodies to be welded, means for supplying an alternating current to the welding joint, electrically operated means for opening and closing said electrodes, electrically operated means for opening and closing the alternating current welding circuit, and electrically operated means for subjecting the joint between said bodies to pressure during the welding operation, the said last-mentioned three means being disposed in a direct current circuit and actuated by said current.

22. An electrically operated apparatus for electric welding, comprising electrodes receiving between them the bodies to be welded, one of said electrodes being movable toward and from the other electrode, means for supplying an alternating current to the welding joint, electrically operated means for moving said movable electrode into welding contact, electrically operated means for opening and closing the alternating current welding circuit, electrically operated means for subjecting the movable electrode to pressure during the welding operation, and electrically operated means for disconnecting said pressure means from said movable electrode at all other times; the said last-mentioned four means being disposed in a direct current circuit and actuated by said current.

23. An electrically operated apparatus for electric welding, comprising clamping electrodes for the bodies to be welded, electrically operated means for closing said clamp, electrically operated means for subjecting said clamp to increased pressure, and electrically operated means for locking said pressure means to said clamp, the said clamp closing means, pressure means and locking means being in direct current circuit, means for establishing alternating current at the welding joint, a manually controllable switch lever, and two contacts coöperating therewith and connected in said direct current circuits; whereby upon the movement of said lever to one contact, said closing means, presser means and locking means shall be operated and welding current established, and upon the movement of said lever to the other contact, said welding current shall be interrupted and said locking means and clamp closing means released.

In testimony whereof we have affixed our signatures in presence of two witnesses.

THOMAS E. MURRAY.
HARRY R. WOODROW.

Witnesses:
GERTRUDE T. PORTER,
MAY T. McGARRY.

Copies of this patent may be obtained for five cents each, by addressing the "Commissioner of Patents, Washington, D. C."